Dec. 19, 1967 L. T. HENDRIX 3,358,461
COMMINGLING SEPARATED LIQUIDS WITH A GASEOUS
FEED MIXTURE RESOLVED BY LIQUEFACTION
Filed April 17, 1967 2 Sheets-Sheet 1

FIG. 1

INVENTOR
LLOYD T. HENDRIX

BY Donald W Canady
ATTORNEY

INVENTOR
LLOYD T. HENDRIX

United States Patent Office 3,358,461
Patented Dec. 19, 1967

3,358,461
COMMINGLING SEPARATED LIQUIDS WITH A GASEOUS FEED MIXTURE RESOLVED BY LIQUEFACTION
Lloyd T. Hendrix, Santa Ana, Calif., assignor to Atlantic Richfield Company, Philadelphia, Pa., a corporation of Pennsylvania
Filed Apr. 17, 1967, Ser. No. 634,026
27 Claims. (Cl. 62—17)

ABSTRACT OF THE DISCLOSURE

This invention relates to a method and apparatus for separating liquefiable constituents from a gaseous mixture in several commingling and cooling stages to effect absorption of the liquefiable constituents with the absorption effected at substantially constant temperatures and wherein the second stage liquid effluent is returned to the first stage treating zone as a commingle fluid. The invention also involves the positioning of the separators at increasing elevations in order to effect counter-current gravitational flow of the liquid effluents.

---

Figure 2:
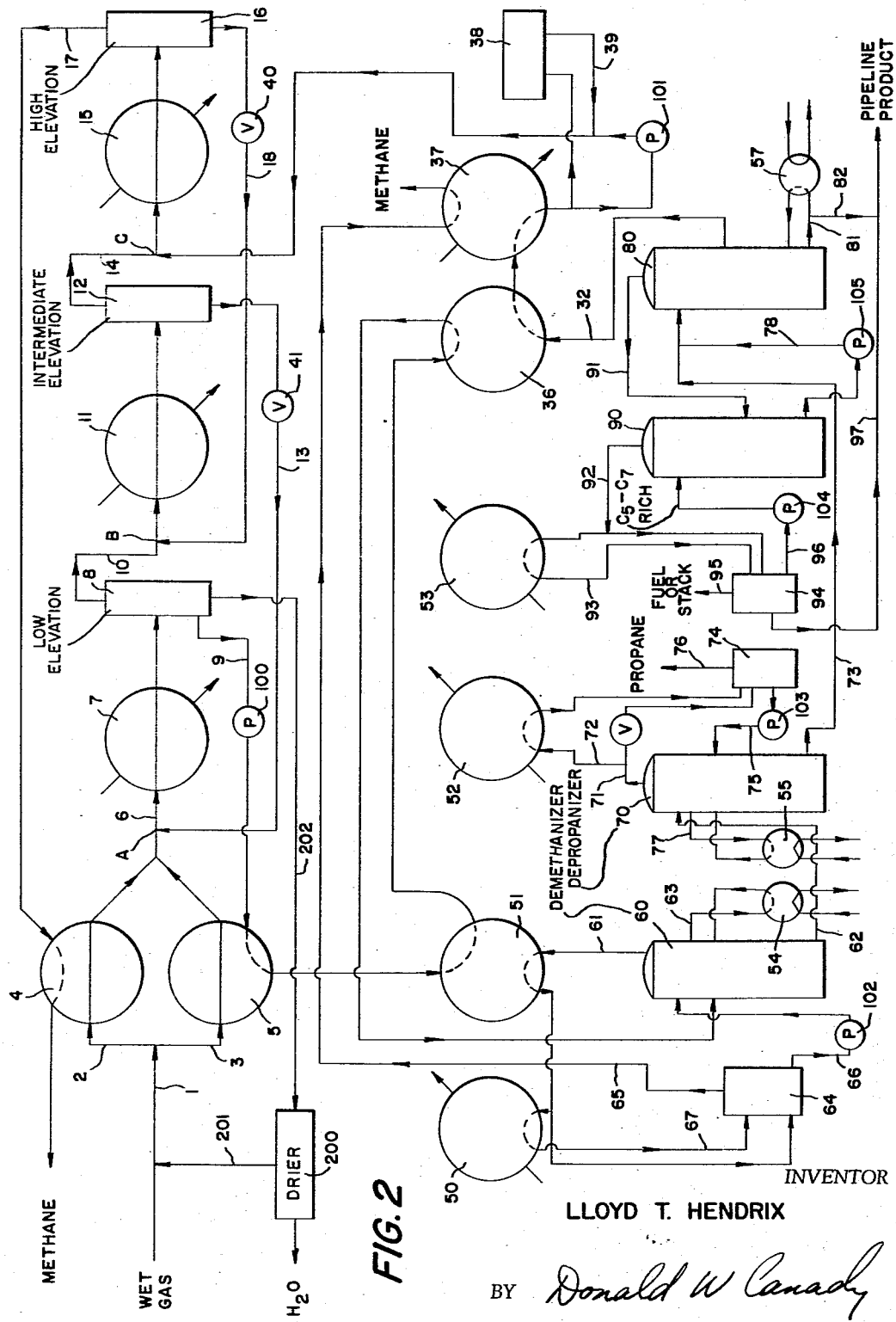

The present invention is a continuation-in-part application of my application S.N. 431,486, now abandoned, filed Jan. 5, 1965, and is directed to a method for separating gaseous mixtures containing constituents of varying boiling points into fractions rich in the lower boiling of the constituents and fractions which are predominantly the higher boiling constituents thereof and, more particularly, to a method for advantageously separating the higher boiling constituents from gaseous mixtures of substances having varying boiling points wherein simple and efficient utilization is made of circulating absorbent liquids.

Gaseous mixtures of components are found in nature and produced in a widely varying design of industrial processes. While in some instances such natural or artificially produced mixtures of gaseous components are useful themselves in many applications, the usefulness and/or marketability of a particular gaseous mixture generally depends upon the degree of success which can be achieved in separating the mixture into its individual components or fractions containing several of its components which constitute the actual materials desired to be utilized in particular applications.

Of the numerous techniques available in the prior art for effecting the desired separation of gaseous mixtures into the ultimately useful components or fractions, one technique entails a selective liquefaction of at least a portion of the constituents in the gaseous mixtures. In such liquefaction procedures the initial mixtures are compressed and cooled to values below the respective dew points of the components participating in the vapor-to-liquid phase change. Many of such separation systems, e.g., those systems for effecting a removal of the higher molecular weight hydrocarbons from a gaseous mixture of hydrocarbons containing methane, ethane, propane, butane, pentane and higher molecular weight homologs thereof, require a combination of relatively high pressures and relatively low temperatures to be utilized in order for the desired separation by liquefaction of the higher boiling constituents present to be achieved. The various techniques previously available thus have not been completely satisfactory in that the requisite combinations of high pressures and low temperatures utilized in the designs thereof dictate the assumption of expenditures for the power requirements of the refrigeration cooling systems which impose substantial limitations on the commercial competitiveness thereof.

Aside from such economic disadvantages of the previously available liquefaction separation processes, many of them further have suffered in certain applications thereof from the disadvantage of operating at conditions at which suitably sharp component separation ratios are not obtained due to the similarity of the condensation characteristics of components in the gaseous mixtures being treated. This problem, centering on an inability to provide a satisfactorily sharp delineation in separation, particularly has plagued prior art separation processes directing themselves to the removal of heavier constituents such as $C_3$ and higher boiling hydrocarbons from gaseous hydrocarbon mixtures, such as natural gas, containing methane, ethane, propane, butanes, pentanes and higher homologs. In such instances, although separation of a fraction containing the butanes, pentanes and heavier hydrocarbons is achieved, the liquefied separated fraction also undesirably contains significant proportions of the lighter hydrocarbons, i.e., methane and ethane, and subsequent operations for recovering such desired lighter materials must provide equipment having a capacity allowing for the appreciable quantities of the lighter constituents in the separated heavy fraction to obtain the desired ultimate product fractions.

One approach which has been suggested in the prior art for overcoming some of the above disadvantages of gas separation processes in which a component liquefaction step is employed entails the utilization of an absorbent liquid circulating in the separation system. In such embodiments the gaseous mixture desired to be treated is brought into contact with an absorbent liquid which has a capability of absorbing constituents from the gaseous mixture, and the amount of the higher boiling constituents removed is increased over that which normally would occur by condensation only at the particular pressure and temperature conditions involved. In such previously available processes, however, the use of an absorbent liquid has not allowed any appreciable increase to be made in the operating temperatures of the separation systems and consequently has not resulted in allowable decreases in the refrigeration power requirements of the systems. Thus, in view of the additional equipment and operating expenditures requisite for the circulation of the absorbent liquid, the utilization of absorbent liquids in the majority of the separation techniques heretofore available has not allowed totally satisfactory improvements in the overall economies of the gas separation and recovery methods.

Accordingly, it is the primary object of the present invention to provide an improved method for effecting a separation of a gaseous mixture into suitably desired fractions and/or components wherein said separation is carried out by the removal from the gaseous mixture of the higher boiling constituents thereof in a relatively simple, efficient and economic manner.

It is another object of the present invention to provide an improved method for treating a gaseous mixture, such as a gaseous mixture of hydrocarbons, wherein the gaseous mixture being treated is cooled to effect liquefaction of the higher boiling constituents thereof and said liquefaction advantageously may be carried out at relatively higher temperatures than those requisite for utilization in processes of similar purpose heretofore available.

It is an additional object of the present invention to provide a method for the treatment of a gaseous mixture, especially a gaseous mixture of hydrocarbons, to effect a separation of the mixture, wherein liquefaction of the higher boiling constituents present in the gaseous mixture is carried out with significant improvements in requisite refrigeration power expenditures as compared to similar gas separation processes heretofore available.

It is a further object of the present invention to provide an improved method for separating a gaseous mixture, particularly a gaseous mixture of hydrocarbons, into light and heavy fractions wherein liquefication of the heavier constituents present in the gaseous mixture is carried out and concomitantly efficient use is made of a circulating liquid, characterized by the ability to absorb said heavier constituents.

It is yet another object of the present invention to provide a method for treating a gaseous mixture, in particular a gaseous mixture of hydrocarbons such as natural gas containing $C_1$ and higher hydrocarbons, wherein liquefication and absorption of heavier constituents of the gaseous mixture are carried out thereby effecting a separation thereof from the gaseous mixture, and heat evolved due to said liquefication and absorption substantially is absorbed by components within the absorption system, whereby the refrigeration power expenditures required for use are significantly lower than those requisite for use of similar gas separation processes heretofore available.

It is a particular object of the present invention to provide a method for removing constituents boiling above ethane from gaseous mixtures of hydrocarbons rich in methane and containing hydrocarbons ranging from $C_1$ to about $C_8$ and above involving a liquefication of said constituents boiling above ethane wherein said liquefication is carried out over a plurality of treating stages wherein the gaseous mixture being treated is commingled and contacted with an absorbent liquid and the absorbent liquid is circulated through the separation system in such a manner that the cooling requirements of the system requisite for effecting said separation advantageously are maintained at commercially attractive levels.

It is also an object of my present invention to provide an apparatus for separating liquefiable constituents from a gaseous mixture in several stages without utilizing between the several stages, pumps having high suction pressures.

It is a further object to provide an appartus for separating liquefiable constituents from a gaseous mixture in several stages with the several separators positioned at increased elevations to effect countercurrent gravitational liquid flow.

Another object of my present invention is to provide a method for separating liquefiable constituents from a gaseous mixture by cooling said gaseous mixture with a commingle liquid to effect absorption of said liquefiable constituents at substantially constant temperatures.

Broadly described, the present invention provides a method for separating higher boiling constituents from a feed stream of a mixture of gaseous components which comprises (a) in a first stage treating zone, under temperature and pressure conditions which effect a liquefication of at least a portion of said higher boiling constituents, commingling said gaseous feed mixture with a liquid capable of absorbing at least a portion of said higher boiling constituents therefrom and having a content of the lighter of said higher boiling constituents, (b) cooling the gas-liquid mixture resulting from said first stage commingling step to remove heat evolved in the absorption by said liquid employed in said first stage commingling step of constituents from said gaseous feed mixture to provide a first stage gaseous effluent having a reduced content of said higher boiling constituents and a first stage liquid effluent enriched with said higher boiling constituents, (c) separating said first stage gaseous effluent and said first stage liquid effluent, (d) in a second stage treating zone, under temperature and pressure conditions which effect a liquefication of at least a portion of said higher boiling constituents, commingling said first stage gaseous effluent with a liquid capable of absorbing at least a portion of the remaining higher boiling constituents therefrom, said liquid employed in said second stage commingling step being leaner with respect to the lighter of said higher boiling constituents than that employed in said first stage commingling step, (e) cooling the gas-liquid mixture resulting from said second stage commingling step to remove heat evolved in the absorption by said liquid employed in said second stage commingling step of constituents from said first stage gaseous effluent to provide a second stage gaseous effluent having a further reduced content of said higher boiling constituents and a second stage liquid effluent enriched with said higher boiling constituents, (f) separating said second stage gaseous effluent and said second stage liquid effluent, and (g) passing said second stage liquid effluent to said first stage treating zone and commingling same in said first stage commingling step with said gaseous feed mixture.

The basic flow plan of the present method entails passing the gaseous mixture being treated through each treating stage zone concurrent to the commingling liquid and between each treating stage zone countercurrent to commingling liquid. By means of the method of the invention the desired separation of the higher boiling constituents advantageously may be carried out at higher temperatures than are allowable without the described use of the commingle liquid whereby the method of the invention is characterized by significantly improved and commercially attractive refrigeration power requirements.

In preferred embodiments of the present method, the liquid effluent obtained from the first stage treating zone preferably is treated to separate therefrom and recover the higher boiling constituents and the resultant liquid obtained which is lean with respect to the higher boiling constituents is recycled in the process and constitutes at least a portion of the liquid employed in the second stage treating zone for commingling with the first stage gaseous effluent.

The invention contemplates further embodiments of the method thereof wherein in the above-described process the gaseous effluent of reduced higher boiling constituent content recovered from said second stage treating zone further is passed through an additional one or more, preferably from one to about five, treating stage zones. In certain of such embodiments a liquid capable of absorbing the higher boiling constituents and lean with respect thereto is fed to the last treating stage zone in the series. Commingling steps in each treating stage zone of gas and liquid streams are carried out, and gas-liquid mixtures resulting from the commingling steps are cooled and separated as described above. The gaseous effluent from a treating stage zone is passed to the succeeding stage zone in the series, and liquid effluent obtained in a treating stage zone is passed to a preceding stage zone in the series for commingling with the gaseous mixture fed thereto.

The invention contemplates further embodiments wherein more than one absorbent liquid is employed over a series of at least four treating stage zones. In such embodiments a first absorbent liquid is circulated through at least the first three treating stages in the series to more selectively absorb the lighter of the higher boiling constituents initially present in the gaseous mixture being treated. Through the last one or several of the remaining treating stages, a second absorbent liquid is circulated which is more adapted than the first to selectively absorb the heavier of the higher boiling constituents desired to be removed from the gaseous mixture. Commingling of the gas and liquid streams passed to a treating stage zone in the series and cooling and separation of the resultant commingled stream are effected as in the case where a single absorbent liquid is employed. The invention further contemplates embodiments wherein more than two circulating absorbent liquids are utilized although such embodiments do not constitute those preferred for use in view of the requisite increase in equipment and operating costs.

The invention is applicable for effecting separation of any gaseous mixture containing two or more constituents of varying boiling points. More advantageously adapted to be separated by the present method are gaseous mixtures of hydrocarbons and derivatives thereof such as gaseous mixtures of acyclic and aromatic alcohols, acids, ketones and the like, particularly homologs and isomers. The more preferred embodiments of the method involve the treatment of gaseous mixtures of hydrocarbons rich in methane and containing ethane, propane, butanes, pentanes and heavier gasoline constituents in varying proportions to remove significant proportions of the constituents boiling above ethane. Specific examples of such gaseous hydrocarbon mixtures include natural gas of the type known as wet or distillate gas, casing head gas, i.e., gas produced concomitantly with crude petroleum oil, gas obtained from processes involving thermal and/or catalytic cracking or other treatments of petroleum oil or petroleum oil fractions, and the like similar hydrocarbon gases.

The absorbent liquid or liquids employed in particular embodiments of the method suitably may be any liquid capable of absorbing at least a portion of the higher boiling constituents from the gaseous mixtures being treated at the temperature and pressure conditions utilized. In the preferred embodiments of the invention the absorbent liquid is of the same nature as the heavier constituents desired to be absorbed thereby and is characterized by a higher boiling point or boiling point range in instances wherein absorbent liquid mixtures are employed. In the preferred embodiments of the invention wherein a methane-rich gas is treated to remove propane, butanes, pentanes, and heavier constituents, hydrocarbon liquids are generally employed having an average molecular weight in the range of from about 70 to about 180. In embodiments wherein one commingle hydrocarbon liquid is employed, hexanes, heptanes, octanes, nonanes, decanes, and mixtures thereof constitute the preferred embodiments thereof. In embodiments wherein more than one commingle hydrocarbon liquid is utilized, it is preferred to use initially a lower molecular weight liquid having an average molecular weight range of about 70–100, and then subsequently treat the gaseous effluent in the latter stage zones in the series with a higher molecular weight hydrocarbon commingle liquid or liquids having an average molecular weight in the range of about 110–180. In each instance a selection of the more preferred absorbent liquid will depend upon the particular gaseous mixture to be treated, temperature and pressure conditions at which higher boiling constituents separation is desired to be carried out, ultimately desired final gaseous product, and capacity of the plant in which the system is utilized.

In accordance with the method of the invention the temperature and pressure conditions utilized in treating stage zones in actual embodiments thereof depend primarily upon the particular composition of the gaseous feed mixture being treated. The temperature employed in a treating zone stage of the present invention is the temperature to which the commingled gas-liquid mixture in each stage is cooled preliminary to said separation of the commingled mixture into a gaseous mixture effluent of reduced higher boiling constituent content and commingle liquid effluent enriched with the higher boiling constituents. Initial gaseous feed mixtures having higher concentrations of the higher boiling constituents desired to be removed satisfactorily may be treated in commingling-cooling-separation stage zones in which the cooling elements employed in the cooling step operate at higher temperatures than those employed in treating stage zones of systems employed in the separation of gaseous feed mixtures which are leaner with respect to the higher boiling constituents. Preferably the temperature or temperatures employed are above the critical temperature of the component desired to be recovered in the product gas and below the critical temperature of the constituent or constituents desired to be separated from the gaseous feed mixture. In the preferred embodiments of the invention wherein a methane-rich hydrocarbon gaseous mixture is treated to remove primarily propane, butanes and heavier constituents, temperatures employed, i.e., those to which commingled gas-liquid streams are cooled, are in the range of from about $-10°$ F. to about $30°$ F., preferably from about $0°$ to about $20°$ F. Commingled stream coolers employed in the system suitably may operate at different temperatures, but preferably are maintained at essentially the same temperature.

The particlular pressures utilized are those pressures which are requisite to achieve the desired separation by liquefication and absorption by the commingle absorbent liquid of the higher boiling constituents desired to be removed from the gaseous feed mixture. In the preferred embodiments of the present invention wherein methane-rich hydrocarbon gaseous mixtures are treated to separate $C_3+$ and the like, pressures usually employed in the treating stage zones are in the range of from about 400 to about 1400 p.s.i.g., preferably from about 1100 to about 1300 p.s.i.g.

In accordance with the present method the actual quantity of the commingle liquid employed in particular embodiments depends upon inter alia the specific composition of the gaseous feed mixture and commingle liquid, the desired ultimate gaseous product, and temperature and pressure conditions employed. For the above-indicated specific conditions, the total amount of fresh and/or recycle commingle liquid charged to the system, i.e., the first treating stage zone in which it is employed, usually is in the range of from about 5 to about 50 mols, preferably from about 15 to about 30 mols, per 1000 mols of gaseous feed mixture initially charged to the system in the first treating stage zone. In embodiments of the method employed for removing the higher boiling constituents from ethane-rich hydrocarbon gaseous mixtures, such conditions provide removal of up to 90 mol percent and more of hydrocarbons boiling above propane and in addition separation of up to about 70 mol percent and higher of propane. In the more preferred embodiments of the present method all of the treating stage zones are under essentially the same operating pressure. In accordance with the present method satisfactory separation of the gas stream is obtained without the need for flashing commingled gas-liquid streams.

In accordance with the present method the liquid effluent obtained from the first treating stage zone preferably is then treated to effect a separation and recovery of the lower and higher boiling constituents separated from the gaseous feed mixture in the treating stages. The separation of such constituents from the original commingle liquid suitably may be carried out by any conventional separation technique such as fractionation, solvent extraction, and the like, preferably where applicable involving a series of treatments which result in the constituents separated from the gaseous mixture being recovered as individual usable fractions. Lighter constituents recovered from the commingle liquid corresponding to those desired to be in the final gas product produced by the process suitably may be combined with the gaseous effluent product obtained from the last treating stage zone in the series of the system with a preliminary cooling and/or compression being carried out thereon as desired and/or necessary. The commingle liquid resulting from the removal therefrom of the constituents separated from the gaseous mixture being treated then preferably is recycled to the second treating stage zone (or higher treating stage zone wherein it initially is to be employed) after being satisfactorily cooled and/or placed under pressure for commingling in that treating stage zone with gaseous mixture effluent fed thereto. In instances wherein an additional commingle absorbent liquid is utilized in the latter treating stage zone or zones of the process, the liquid effluent obtained in the last stage of the series in which it is employed, is preferably treated for the separation of the constituents removed from the gas and the resultant recovered lean commingle liquid then recycled, after preliminary cooling and/or compression, to the first stage in the series in which it is utilized for further commingling with gaseous mixture effluent passed to that stage.

Gaseous mixtures adapted for treatment in the present method, particularly gaseous hydrocarbon mixtures, often contain water vapor. The present invention contemplates embodiments wherein such moisture-containing gases are treated preliminary to the passage of the gaseous mixture to the first stage treating zone for removal of at least a portion of the moisture and wherein moisture removal is carried out in the treating stage zones of the process, usually in the first treating stage zone, concomitantly with the separation of higher boiling constituents from the gaseous feed mixture. In embodiments of the latter type a dehydrating agent, which remains in a non-vaporous state at the temperature and the pressure conditions obtained in the treating stage or stages in which the moisture removal is carried out, is introduced into the system before or during commingling of the gaseous feed mixture and commingle absorbent liquid. After the cooling of the gas-liquid mixture resulting from the commingling step, the dehydrating agent along with moisture separated from the gaseous mixture thereby then may be recovered from the treating stage zone. Dehydrating agents preferred for utilization are those which, due to the relative physical properties thereof and those of the commingled gas-liquid mixture, do not enter into homogeneous mixture with any constituent present other than water whereby the recovery of the moisture-containing dehydrating agent easily may be carried out by simple physical means. Such dehydrating agents advantageously may be solid desiccants or liquids which are immiscible with the non-aqueous constituents present. In embodiments of the present method wherein the gaseous feed mixture being treated and commingle liquid are hydrocarbons, the preferred dehydrating agent is a glycol such as ethylene glycol, propylene glycol and the like.

The method of the invention will be more fully understood from the following description given with reference to the accompanying drawings of which:

FIGURE 1 is a flow diagram of an embodiment of the method of the invention wherein three gaseous mixture-absorbent liquid commingling stages are utilized to treat a gaseous hydrocarbon mixture rich in methane; and FIGURE 2 is a flow diagram of an embodiment of the present method similar to that shown in FIGURE 1 wherein three gas-absorption liquid commingling stages are utilized to treat a gaseous hydrocarbon mixture rich in methane and further shows in greater detail a system combined therewith for effecting the separation and recovery from the commingle absorbent liquid of constituents removed thereby from the gaseous hydrocarbon feed mixture.

With reference to FIGURE 1, a gaseous feed mixture of hydrocarbons composed predominantly of methane and containing hydrocarbons ranging from $C_1$ to about $C_8$ enters the system through conduit 1. The gaseous feed stream enters at an elevated pressure of from about 400 to about 1400 p.s.i.g. and an ambient temperature usually ranging from about 70° to about 125° F. The gaseous feed stream is split into two separate streams and the separated streams passed via lines 2 and 3 through a set of parallel heat exchangers 4 and 5, respectively, wherein they are partially cooled. The portion of the gaseous feed passed through heat exchanger 4 is partially cooled by a cold gaseous effluent, predominantly methane, obtained overhead from a separator 16 and charged to cooler 4 through conduit 17. In heat exchanger 5 the portion of the gaseous feed stream passed therethrough is partially cooled by cold first treating stage zone liquid effluent (consisting of a commingle hydrocarbon liquid having an average molecular weight of about 70 to 180 and containing hydrocarbons, predominantly $C_3$ and higher hydrocarbons, removed from gaseous hydrocarbon feed previously passed through the system) obtained from a separator 8 and passed to cooler 5 via conduit 9. The partially cooled gaseous streams obtained from heat exchangers 4 and 5 then are recombined in line 6 and therein at point A commingled without pressure reduction with cold second treating stage zone liquid effluent obtained from a separator 12 and passed to commingle point A via line 13. The commingled gaseous feed mixture and liquid is then cooled to a temperature of about −10° to about 30° F. in a cooler 7. The temperature to which the commingled gaseous mixture and liquid are cooled in cooler 7 depends primarily upon the composition of the gaseous hydrocarbon feed stream, the lower temperatures being preferred for gaseous hydrocarbon mixtures lean with respect to the higher boiling point hydrocarbon constituents and the higher cooling temperatures being preferred for separation treatments of hydrocarbon feed gases relatively rich in the higher boiling hydrocarbon constituents. The resultant cooled gas-liquid mixture then is passed without pressure reduction to a separator 8. From separator 8 a first treating stage zone methane-rich gaseous effluent having a reduced content of propane and higher boiling point hydrocarbon constituents, as compared to that passed to point A, is removed by line 10. A first treating stage zone liquid effluence stream consisting of liquid passed to point A enriched with propane and higher boiling constituents and some methane and ethane removed from the gas stream passed to point A is obtained from separator 8 and passed via line 9 through heat exchanger 5 to a fractionator 20. The gaseous effluent obtained from separator 8 is commingled beginning at point B in line 10 without pressure reduction with a third treating stage zone liquid effluent obtained from a separator 16 and passed to point B via line 18. The commingling of the gaseous and liquid streams at point B effects a slight increase in temperature of the combined stream. The combined gas-liquid stream then is cooled in a cooler 11 to a temperature of about −10° to 30° F., with cooler 11 preferably being operated to provide a cooled gas-liquid mixture of essentially the same temperature as that obtained in cooler 7. The cooled gas-liquid mixture from cooler 11 then without pressure reduction is separated in a separator 12 into a methane-rich second stage zone gaseous effluent of reduced content of propane and higher boiling point hydrocarbon constituents, as compared to that passed to point B, which is recovered via line 14 and a second stage zone liquid effluent consisting of liquid passed to point B enriched with propane and higher boiling point constituents and some methane and ethane removed from the gaseous mixture passed to point B, which is recovered by line 13 and passed to point A in line 6. Second stage gaseous effluent recovered from separator 12 is commingled without pressure reduction at point C in line 14 with fresh lean commingling liquid having a temperature essentially the same as the second stage gaseous effluent. The lean commingling liquid is a hydrocarbon liquid having an average molecular weight in the range of about 70 to 180. The fresh commingling liquid is introduced at point C in an amount of from about 5 to about 50 mols per 1000 mols of gaseous feed mixture fed to point A. The resultant commingled gas-liquid mixture undergoes a slight increase in temperature and is then cooled in a cooler 15 to −10° to 30° F., with cooler 15 preferably being operated to provide a commingled gas-liquid stream temperature which is essentially the same as those provided in coolers 7 and 11. The cooled commingled stream obtained in cooler 15 is then separated without pressure reduction in a separator 16 into a methane-rich third stage gaseous effluent of further reduced content of propane and higher boiling point hydrocarbon constituents, as compared to that fed to point C, and a third stage liquid effluent stream consisting of the fresh commingle liquid enriched with the propane and higher boiling constituents, and some methane and ethane, which were separated from the gas stream passed to point C. The third stage liquid effluent is recovered by line 18 and passed to point B in line 10. The third stage gaseous effluent is recovered from separator 16 via line 17, passed to heat exchanger 4 where it is employed to partially pre-cool fresh gaseous feed mixture, and then removed from the system as a product gas rich in methane and ethane.

The first stage liquid effluent stream obtained from separator 8 and consisting of commingle liquid enriched with constituents separated from the gaseous feed mixture in the process then is treated to effect recovery of the separated constituents. The first stage liquid effluent contains some of the lower boiling constituents, i.e., methane and ethane, desired in the ultimate process product gas. These lighter constituents are separated by high pressure fractionation in a fractionator 20 and recovered as an overhead stream through line 21, passed through heat exchanger 37 to cool fresh lean commingle fluid, and then removed from the system as a combined or separate product gas stream. A liquid stream containing commingle liquid and the heavier, i.e., $C_3+$ of the constituents separated from the gaseous feed mixture is recovered as a bottom stream from fractionator 20 and passed via line 22 to a low pressure separation zone 30. In separation zone 30 the lighter of the gas-separated higher boiling point constituents present, e.g., those boiling in the $C_3$–$C_4$ range, are recovered as an overhead stream through line 31, and removed from the system as a product stream. Gas-separated constituents in an intermediate range, e.g., those boiling in the $C_5$–$C_7$ range, are recovered via line 33. Lean commingle liquid is recovered through line 32 as a bottom stream from separation zone 30. Amounts of the heavier of the higher boiling point constituents separated from the gaseous mixture treated in the process which would represent a build-up in the system of commingle liquid are bled from the system via line 33. The fresh lean commingle liquid then is precooled in a cooler 34 and recycled with final cooling in exchanger 37 to commingle point C in line 14.

FIGURE 2 is a flow sheet of an embodiment of the method of the invention similar to that presented in FIGURE 1 for treating a methane-rich hydrocarbon gaseous mixture, with FIGURE 2 presenting in greater detail a preferred system for use in the subject method for treating first stage liquid effluent consisting of commingle liquid fat with respect to the higher boiling point constituents removed from the gaseous feed in the process. Like numerals in FIGURES 1 and 2 refer to like elements. The methane-rich gaseous feed mixture shown in FIGURE 2 as entering the system via conduit 1 is a moisture-containing stream. A dehydrating agent, such as ethylene glycol, is introduced by line 201 into the gaseous feed stream in line 1 and passed in admixture therewith through heat exchangers 4 and 5 and cooler 7 into separator 8. The dehydrating agent containing moisture removed from the gaseous feed mixture is recovered from separator 8 through line 202 and passed to a water removal zone 200 wherein the dehydrating agent is dried. The dried dehydrating agent is then recycled to the system by line 201. In the system shown in FIGURE 2 separators 12 and 16 preferably are positioned at increasing elevations with vacuum breaker valves 41 and 40 being placed in liquid lines 13 and 18, respectively, in order to effect countercurrent gravitational flow of the liquid effluents. This positioning of the separators permits operation at high pressures (up to about 1000 p.s.i.) without utilizing pumps having high suction pressures. For example, the liquid and gaseous effluents from chiller 15 may be piped into separator 16 through a vertical pipe sized to give spray or annular to spray flow. The minimum height of vessel 16 is such that the density of the liquid scrubbed out multiplied by the height is equal to or greater than the pressure drop between point B to vessel 16.

With further reference to FIGURE 2, first stage liquid effluent consisting of commingling liquid fat with respect to propane and higher boiling point hydrocarbon constituents, as well as some methane and ethane, is recovered from separator 8 in the first stage of the process via line 9, passed by means of pump 100 through gaseous feed mixture heat exchanger 5, a demethanizer column overhead heat exchanger 51, and a recycle lean commingle liquid heat exchanger 36 whereby it is heated and then to a high pressure demethanizing column 60. Demethanizing column 60 is heated by means of a steam-heated reboiler 54 through which liquid is circulated via line 63. An overhead gaseous stream is recovered from demethanizer 60 through line 61, partially cooled in demethanizer overhead heat exchanger 51 by cool first stage liquid effluent, further cooled by the passage of a portion thereof through a cooler 50, and then passed to a condenser 64. Liquid obtained in condenser 64 is refluxed to demethanizer 60 through line 66 by pump 102. An uncondensed vapor stream is obtained from condenser 64, heated in a recycle lean commingle liquid heat exchanged 37 and then removed from the system as a high methane-containing product gas. A bottoms liquid stream is recovered from demethanizer 60 via line 62 and passed to a depropanizing column 70 maintained under a lower pressure than demethanizer 60. Depropanizing column 70 is heated by a steam-heated reboiler 55 through which liquid is circulated via line 77. A gaseous overhead stream is recovered from depropanizer 70 in line 71, cooled by passing a portion thereof through an overhead cooler 52 via line 72 and then charged to a condenser 74. An uncondensed vapor stream predominantly propane is recovered from condenser 74 and removed from the system through line 76 as a product gas. Condensed liquid recovered from condenser 74 is refluxed to depropanizer 70 by pump 103 in line 75. A bottoms liquid stream is recovered from depropanizer 70 through line 73 and passed to a commingle liquid bottoms fractionation column 80. Column 80 is heated by means of a steam-heated reboiler 57 through which liquid is passed via line 81. A gaseous overhead stream is recovered from column 80 in line 91 and passed to a commingle liquid tops fractionating column 90. Gaseous effluent recovered from column 90 in overhead line 92 is cooled by passing a portion thereof via line 93 through a cooler 53 and then charged to a condenser 94. Uncondensed vapor obtained in condenser 94, usually rich in $C_3$–$C_4$ hydrocarbons in preferred embodiments of the process, is removed from the system via line 95 as a fuel product stream or vented as a stack gas. The major portion of the condensate obtained in condenser 94, usually rich in $C_5$–$C_7$ hydrocarbons in the preferred embodiments of the process, is refluxed to column 90 by pump 104 in line 96 and the remainder thereof is removed from the system via line 97 as a liquid pipeline product. A bottoms liquid stream recovered from column 90 is recycled in line 78 by pump 105 to column 80. A stabilized lean commingle liquid stream is recovered from column 80 in line 32 and recycled to point C in line 14 by pump 101. In line 32 the recycle commingle liquid is passed through lean heat exchangers 36 and 37, wherein it is cooled by demethanizer column feed and demethanizer column overhead streams, respectively, to about −10° to about 30° F., preferably to be at essentially the same temperature and pressure as the second stage gaseous effluent passed from separator 12 to point C in line 14. Commingle hydrocarbon liquid which would represent a build-up in the system is bled from the system in line 82.

The method of the invention having been described in detail, the following example is presented to show a specific embodiment thereof. It will be understood that the example is given merely for illustration purposes and not by way of limitation.

*Example*

N-octane was employed in the system shown in FIGURE 2, as the commingle fluid to treat a wet gas. 60% ethylene glycol was circulated through the system via cooler 7, separator 8, and water removal unit 200 to remove moisture from the wet gas feed. Coolers 7, 11, and 15 were operated, using propane as the cooling medium, to provide cooled commingled gas-liquid streams having a temperature of about 0° F. which were charged to separators 8, 12, and 16, respectively. The compositions of the wet gas feed, commingle liquid feed, and liquid and gaseous effluent streams obtained in separators 8, 12, and 16 are set forth below in Table 1.

TABLE 1

| | Wet Gas Feed, mols/hr. (line 1) | First Stage Zone Effluent, mols/hr. | | Second Stage Zone Effluent, mols/hr. | | Third Stage Zone Effluent, mols/hr. | | Commingle Liquid Feed, mols/hr. (line 32) |
|---|---|---|---|---|---|---|---|---|
| | | Liquid (line 9) | Gaseous (line 10) | Liquid (line 13) | Gaseous (line 14) | Liquid (line 18) | Gaseous (line 17) | |
| Constituent: | | | | | | | | |
| Carbon Dioxide | 2.199 | 0.666 | 1.912 | 0.379 | 1.796 | 0.263 | 1.533 | −0 |
| Nitrogen | 7.311 | 0.155 | 7.245 | 0.089 | 7.227 | 0.071 | 7.156 | −0 |
| Methane | 972.171 | 93.683 | 929.024 | 50.519 | 916.289 | 37.776 | 878.513 | −0 |
| Ethane | 63.038 | 19.101 | 54.801 | 10.859 | 51.496 | 7.551 | 43.945 | −0 |
| Propane | 34.367 | 22.577 | 22.981 | 11.178 | 17.907 | 6.098 | 11.809 | −0 |
| Iso-butane | 5.024 | 4.337 | 2.357 | 1.670 | 1.388 | 0.701 | 0.687 | −0 |
| N-butane | 8.267 | 7.681 | 2.917 | 2.332 | 1.406 | 0.821 | 0.585 | −0 |
| Iso-pentane | 2.122 | 2.102 | 0.359 | 0.340 | 0.086 | 0.067 | 0.020 | −0 |
| N-pentane | 1.803 | 1.791 | 0.282 | 0.271 | 0.058 | 0.047 | 0.011 | −0 |
| N-hexane | 1.077 | 1.077 | 0.052 | 0.052 | 0.003 | 0.003 | 0.000 | −0 |
| N-heptane | −0 | −0 | −0 | −0 | −0 | −0 | −0 | −0 |
| N-octane | 2.001 | 23.666 | 0.366 | 22.030 | 0.355 | 22.020 | 0.323 | 21.988 |
| N-nonane | −0 | −0 | −0 | −0 | −0 | −0 | −0 | −0 |
| N-decane | −0 | −0 | −0 | −0 | −0 | −0 | −0 | −0 |
| N-undecane | −0 | −0 | −0 | −0 | −0 | −0 | −0 | −0 |
| Total | 1,099.380 | 176.836 | 1,022.295 | 99.717 | 998.013 | 75.419 | 944.582 | 21.988 |
| Temperature, °F | 0 | 0 | 0 | 0 | 0 | 0 | 0 | 0 |
| Pressure, p.s.i.a | 1,215.000 | 1,215.000 | 1,215.000 | 1,215.000 | 1,215.000 | 1,215.000 | 1,215.000 | 1,215.000 |

Demethanizer column 60 was operated at a feed stream temperature of about 175° F., a pressure of about 1280 p.s.i.a., an overhead vapor stream temperature of about 92° F., a bottoms stream temperature of about 395° F., and reflux of overhead condensate in line 66 at about 10° F. A methane-rich stream was recovered through line 65 at a rate of about 2080 lbs./hr. Depropanizer column 70 was operated at a pressure of about 250 p.s.i.a., an overhead vapor stream temperature of about 130° F., a bottoms stream temperature of about 315° F., and a reflux of overhead condensate in line 75 at about 90° F. A propane-rich stream was recovered through line 76 at a rate of about 2370 lbs./hr. Lean commingle liquid bottoms tower 90 was operated at a pressure of 55 p.s.i.a., bottoms stream temperature of 400° F., and overhead vapor stream temperature of about 190° F. A lean commingle n-nonane fraction was withdrawn from tower 80 in line 32 at about 365° F. Commingle liquid tops tower 90 was operated at a pressure of 55 p.s.i.a., an overhead vapor stream temperature of about 170° F., bottoms stream temperature of about 230° F., and reflux of overhead condensate in line 96 at about 115° F. About 1300 lbs./hr. of liquid hydrocarbons were removed from separator 94 in line 97 and combined with about 144 lbs./hr. of liquid hydrocarbons bled from line 81 via line 82 to provide a pipeline hydrocarbon liquid product.

Although my present invention has been described herein with a certain degree of particularity with respect to an embodiment thereof it is to be understood that the scope of my invention is not limited to this embodiment but is of the full scope of the following claims.

What is claimed is:

1. A method for separating higher boiling constituents from a feed stream of a mixture of gaseous components which comprises:
   (a) in a first stage treating zone, under temperature and pressure conditions which effect a liquefaction of at least a portion of said higher boiling constituents, commingling said gaseous feed mixture with a liquid capable of absorbing at least a portion of said higher boiling constituents therefrom,
   (b) cooling the gas-liquid mixture resulting from said first stage commingling step to remove heat evolved in the absorption by said commingle liquid of constituents from said gaseous feed mixture to provide a first stage gaseous effluent having a reduced content of said higher boiling constituents and a first stage liquid effluent enriched with said higher boiling constituents,
   (c) separating said first stage gaseous effluent and said first stage liquid effluent,
   (d) in a second stage treating zone, under temperature and pressure conditions which effect a liquefaction of at least a portion of the remaining said higher boiling constituents, commingling said first stage gaseous effluent with a liquid capable of absorbing at least a portion of the remaining higher boiling constituents therefrom,
   (e) cooling the gas-liquid mixture resulting from said second stage commingling step to remove heat evolved in the absorption by said liquid employed in said second stage commingling step of constituents from said first stage gaseous effluent to provide a second stage gaseous effluent having a further reduced content of said higher boiling constituents and a second stage liquid effluent enriched with said higher boiling constituents,
   (f) separating said second stage gaseous effluent and said second stage liquid effluent, and
   (g) passing said second stage liquid effluent to said first stage treating zone and commingling same in said first stage commingling step with said gaseous feed mixture.

2. The method according to claim 1 wherein said gaseous feed mixture is a gaseous hydrocarbon mixture.

3. The method of claim 1 wherein said initial feed stream is initially subjected to the action of a dehydrating agent to effect removal of moisture from said gaseous feed mixture.

4. The method of claim 1 wherein said commingling and absorption continues during said cooling steps to effect absorption at substantially constant temperature.

5. The method of claim 1 wherein said first stage separations and said second stage separations are performed in separators positioned at increased elevations to effect countercurrent gravitational flow of said liquid effluents.

6. The method according to claim 2 wherein said liquid employed in said commingling step in said second treating stage zone is a hydrocarbon liquid.

7. The method according to claim 2 wherein said gaseous hydrocarbon feed mixture is predominantly methane and contains hydrocarbons having from one to about eight carbon atoms.

8. The method according to claim 7 wherein said liquid employed in said commingling step in said second treating zone is a hydrocarbon liquid having an average molecular weight in the range of from about 70 to about 180.

9. The method according to claim 8 wherein said liquid hydrocarbon is n-nonane.

10. The method according to claim 8 wherein the amount of said hydrocarbon liquid employed is in the range of from about 5 to about 50 mols per 1000 mols of said gaseous hydrocarbon feed mixture.

11. The method according to claim 8 wherein said first and second stage zones are maintained under a pressure of from about 400 to about 1400 p.s.i.g.

12. The method according to claim 8 wherein said gas-liquid mixtures resulting from said commingling step in said first and second treating stage zones are cooled in said cooling steps to a temperature in the range of from about −10° F. and about 30° F.

13. A method for separating higher boiling constituents from a feed stream of a mixture of gaseous components which comprises:
  (a) in a first stage treating zone, under temperature and pressure conditions which effect a liquefaction of at least a portion of said higher boiling constituents, commingling said gaseous feed mixture with a liquid capable of absorbing at least a portion of said higher boiling constituents therefrom and having a content of the lighter of said higher boiling constituents,
  (b) cooling the gas-liquid mixture resulting from said first stage commingling step to remove heat evolved in the absorption by said commingle liquid employed in said first stage commingling step of constituents from said gaseous feed mixture to provide a first stage gaseous effluent having a reduced content of said higher boiling constituents and a first stage liquid effluent enriched with said higher boiling constituents,
  (c) separating said first stage gaseous effluent and said first stage liquid effluent,
  (d) in a second stage treating zone, under temperature and pressure conditions which effect a liquefaction of at least a portion of the remaining said higher boiling constituents, commingling said first stage gaseous effluent with a liquid capable of absorbing at least a portion of the remaining higher boiling constituents therefrom, said liquid employed in said second stage commingling step being leaner with respect to the lighter of said higher boiling constituents than that employed in said first stage commingling step,
  (e) cooling the gas-liquid mixture resulting from said second stage commingling step to remove heat evolved in the absorption by said liquid employed in said second stage commingling step of constituents from said first stage gaseous effluent to provide a second stage gaseous effluent having a further reduced content of said higher boiling constituents and a second stage liquid effluent enriched with said higher boiling constituents,
  (f) separating said second stage gaseous effluent and said second stage liquid effluent, and
  (g) passing said second stage liquid effluent to said first stage treating zone and commingling same in said first stage commingling step with said gaseous feed mixture.

14. In a method for treating a feed stream of a gaseous mixture of constituents having varying boiling points to separate higher boiling constituents therefrom wherein said gaseous mixture is passed through a series of at least three treating stage zones maintained at an elevated pressure whereby liquefaction of at least a portion of said higher boiling constituents is effected in each of said stage zones in said series to provide at each stage zone a gaseous effluent stream having a reduced content of said higher boiling constituents and wherein a liquid capable of absorbing said higher boiling constituents is passed through said series of treating stage zones to provide at each stage zone a liquid effluent stream enriched with a portion of said higher boiling constituents, the steps of: in each treating stage zone, concurrently contacting and commingling the gaseous stream passed thereto with the liquid stream passed thereto, in each treating stage zone cooling the resultant gas-liquid mixture obtained from said commingling step to remove heat evolved in said commingling, in each treating stage zone separating the mixture resulting from said cooling step into one of said gaseous effluent streams and one of said liquid effluent streams, and between treating stage zones in said series thereof passing liquid effluent streams countercurrent stagewise to the direction of flow of said gaseous effluent streams.

15. The method according to claim 14 wherein said gaseous feed mixture is a gaseous hydrocarbon mixture.

16. The method according to claim 15 wherein said liquid capable of absorbing said higher boiling constituents is a hydrocarbon liquid.

17. The method according to claim 15 wherein said gaseous hydrocarbon feed mixture is predominantly methane and contains hydrocarbons having from one to about eight carbon atoms.

18. The method according to claim 17 wherein said liquid capable of absorbing said higher boiling constituents is a hydrocarbon liquid having an average molecular weight in the range of from about 70 to about 180.

19. The method according to claim 18 wherein said hydrocarbon liquid is n-nonane.

20. The method according to claim 18 wherein the amount of said hydrocarbon liquid employed is in the range of from about 5 to about 50 mols per 1000 mols of said gaseous hydrocarbon feed mixture.

21. The method according to claim 18 wherein said series of treating stage zones is maintained under a pressure in the range of from about 800 to about 1400 p.s.i.g.

22. The method according to claim 18 wherein in each of said treating stage zones said gas-liquid mixture obtained from said commingling step is cooled in said cooling step to a temperature in the range of from about −10° to about 30° F.

23. The method according to claim 14 wherein said liquid capable of absorbing said higher boiling constituents is recovered from the liquid effluent stream obtained from the first treating stage zone in said series thereof and said recovered liquid is recycled through said series of treating stage zones.

24. The method according to claim 14 wherein the gaseous effluent stream obtained from the last treating stage zone in said series thereof subsequently is contacted and commingled under said elevated pressure in an additional treating stage zone with a second liquid capable of absorbing the heavier of said higher boiling constituents, the gas-liquid mixture resulting from said commingling in said additional treating stage zone is cooled to remove heat evolved in said commingling, and thereafter the cooled mixture resulting from said cooling step is separated into a gaseous effluent having a reduced content of said higher boiling constituents and a liquid effluent enriched with said higher boiling constituents, said second liquid employed in said additional treating stage zone havng a higher average molecular weight than that employed in said series of said treating stage zones.

25. The method according to claim 24 wherein said gaseous feed mixture is a gaseous hydrocarbon mixture predominantly methane and contains hydrocarbons having from one to about eight carbon atoms and said liquid capable of absorbing said higher boiling constituents which is employed in said series of said treating stage zones is a hydrocarbon liquid having an average molecular weight in the range of from about 70 to about 100.

26. Apparatus for separating higher boiling constituents from a feed stream of a mixture of gaseous components comprising in combination:
(a) means for commingling said gaseous feed stream with a liquid capable of absorbing at least a portion of said higher boiling constituents therefrom in a first stage treating zone under temperature and pressure conditions which effect a liquefaction of at least a portion of said higher boiling constituents,
(b) means for cooling the gas-liquid mixture resulting from said first stage commingling step to remove heat evolved in the absorption by said commingle liquid, constituents from said gaseous feed mixture to provide a first stage gaseous effluent having a reduced content of said higher boiling constituents and a first stage liquid effluent enriched with said higher boiling constituents;
(c) means for separating said first stage gaseous effluent and said first stage liquid effluent, a vertical pipe extending between said cooling means and said separation means for passing said first stage gaseous effluent and said first stage liquid effluent through said separation means and being of a size to cause annular to spray flow through said pipe,
(d) a second stage treating zone for commingling said first stage gaseous effluent with a liquid capable of absorbing at least a portion of the remaining higher boiling constituents therefrom under temperature and pressure conditions which affect the liquefaction of at least a portion of the remaining said higher boiling constituents,
(e) means for cooling said gas-liquid mixture resulting from said second stage commingling to remove heat evolved in the absorption by said liquids employed in said second stage commingling step of constituents from said first stage gaseous effluent to provide a second stage gaseous effluent having a further reduced content of higher boiling constituents and a second stage effluent enriched with higher boiling constituents,
(f) means for separating said second stage gaseous effluent and said second stage liquid effluent, said separating means being positioned at an elevation higher than the position of said first stage separation means and being connected to said second stage cooling means with a vertical pipe of a size to give annular to spray flow of said second stage gaseous effluent and said second stage liquid effluent into said second stage separation means, and
(g) means for passing said second stage liquid effluent to said first stage treating zone and commingling same in said liquid stage commingling step with said gaseous feed mixture.

27. The apparatus of claim 26 wherein the minimum height of said separation means is such that the density of the liquid effluent multiplied by said height is equal to or greater than the pressure drop between said second stage separator and said first stage commingling means.

References Cited

UNITED STATES PATENTS

| | | |
|---|---|---|
| 2,617,276 | 11/1952 | Gard et al. |
| 2,777,305 | 1/1957 | Davison _____ 62—28 XR |
| 2,821,502 | 1/1958 | Gillett et al. |

NORMAN YUDKOFF, *Primary Examiner.*

V. WALTER PRETKA, *Assistant Examiner.*